United States Patent [19]
Bourke

[11] Patent Number: 5,595,250
[45] Date of Patent: Jan. 21, 1997

[54] DRILL ACCESSORY

[76] Inventor: George C. Bourke, 8176 Spanker Ridge Dr., Bentonville, Ark. 72712

[21] Appl. No.: 591,692

[22] Filed: Jan. 25, 1996

Related U.S. Application Data

[63] Continuation-in-part of Ser. No. 414,029, Mar. 31, 1995.

[51] Int. Cl.⁶ ................................. B23D 51/10
[52] U.S. Cl. ................. 173/29; 30/376; 30/392; 30/500; 144/48.6; 408/20
[58] Field of Search .............................. 173/29; 30/286, 30/295, 392, 500, 370, 376, 377; 144/1 F; 408/20, 21

[56] References Cited

U.S. PATENT DOCUMENTS

| | | | |
|---|---|---|---|
| 1,855,371 | 4/1932 | Ungar | 30/376 |
| 2,547,922 | 4/1951 | Bechtold | 30/376 |
| 2,631,619 | 3/1953 | Folli | 30/500 |
| 2,713,271 | 7/1955 | Dodegge | 30/392 |
| 2,764,188 | 9/1956 | Hoffman | 30/392 |
| 2,822,005 | 2/1958 | Lee et al. | 30/500 |
| 3,398,588 | 8/1968 | Mejia | 30/392 |
| 3,496,972 | 2/1970 | Rees | 30/376 |
| 3,876,015 | 4/1975 | Kivela | 30/500 |

FOREIGN PATENT DOCUMENTS

| 1384903 | 2/1975 | United Kingdom | 30/500 |
|---|---|---|---|

*Primary Examiner*—Scott A. Smith

[57] ABSTRACT

The drill attachment is a cordless, electric or pneumatic drill device having three (3) flush cut features which enables user to saw in a reciprocating action. A compact metal enclosure has steel bevel gears together to generate perpetual motion onto an eccentric peg to drive arm to blade. The rotation of the drill enters the tool by the removable hexagonal shaft which can be inserted into the tool at three (3) different angles depending on the task. The small bevel gear meshes with a larger bevel hub gear having an eccentric peg that is inside an elongated slot of the blade drive armature. As the small bevel gear rotates, its speed is increased by ratios in the larger bevel hub gear; the rotation of the larger bevel hub gear is converted to a linear reciprocating motion which drives the blade.

4 Claims, 7 Drawing Sheets

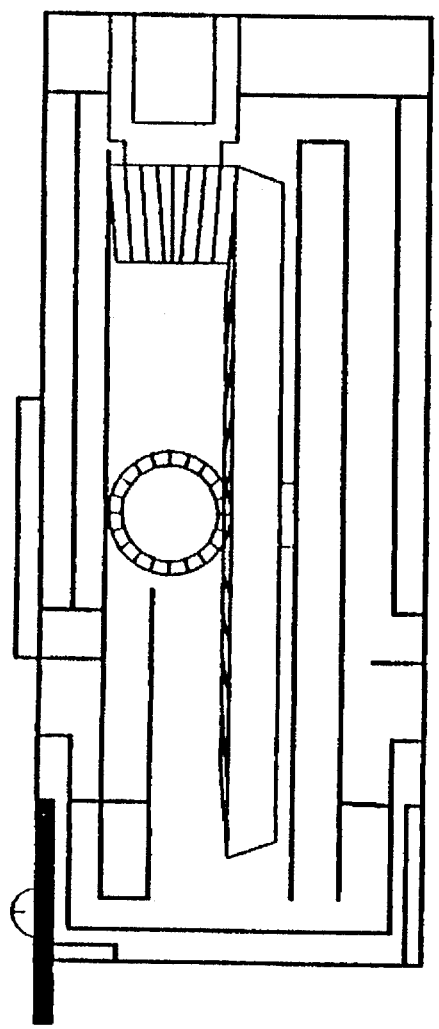
FIGURE #1

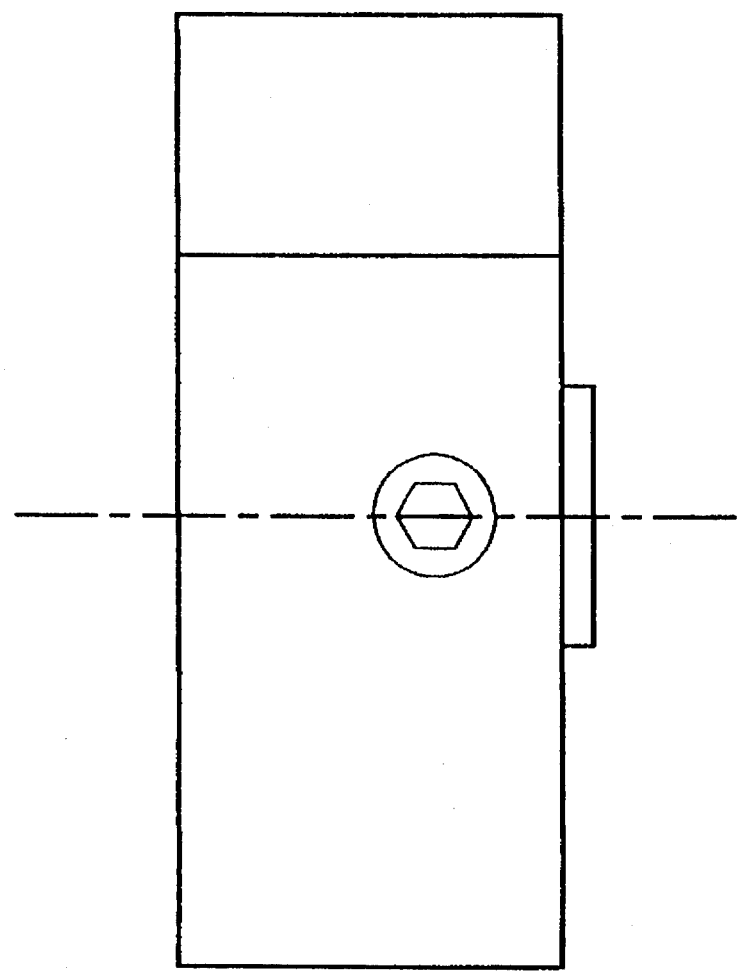
FIGURE #2

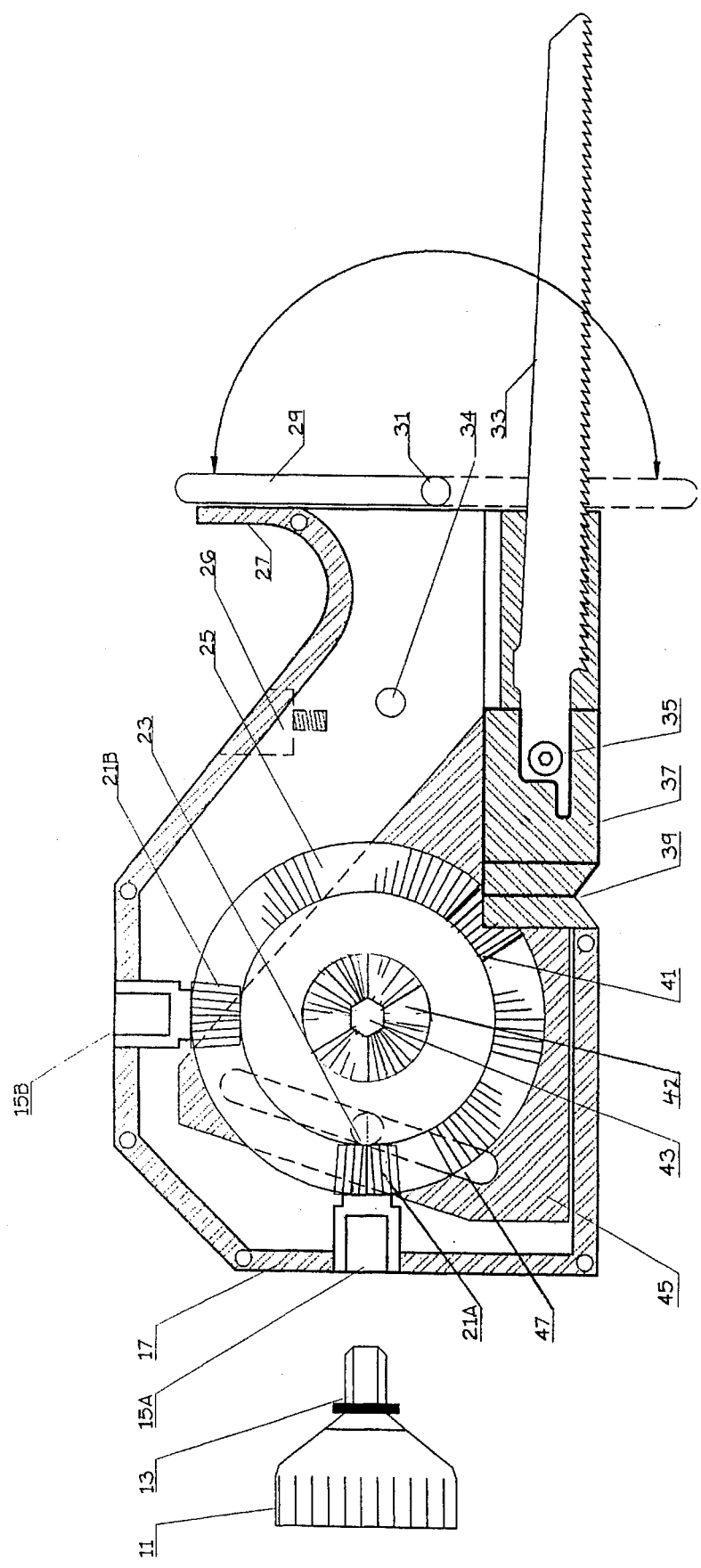
FIGURE #3

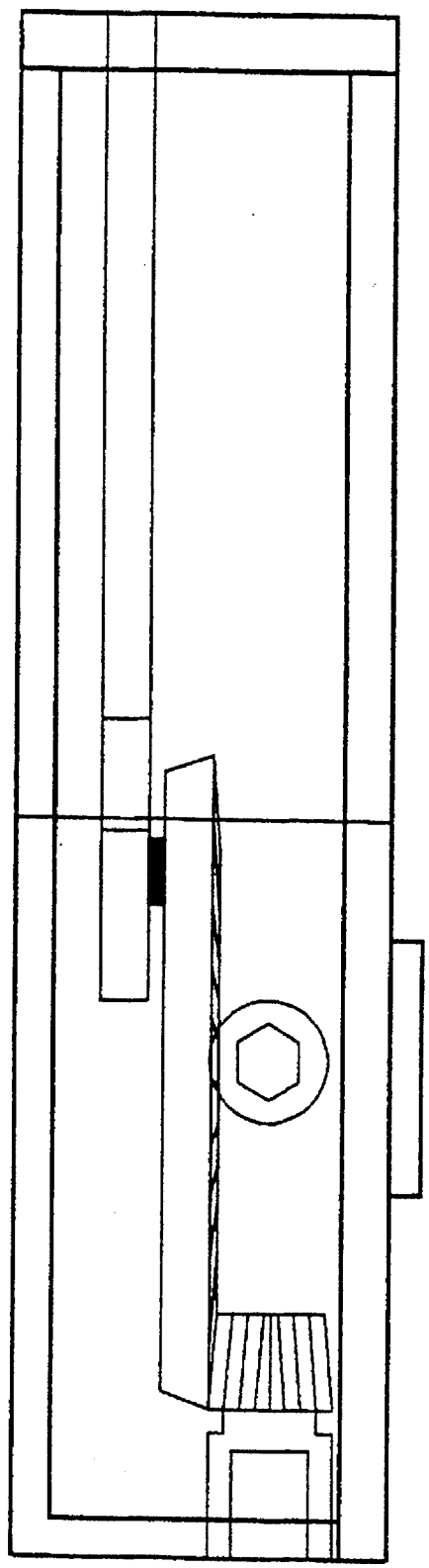
FIGURE #4

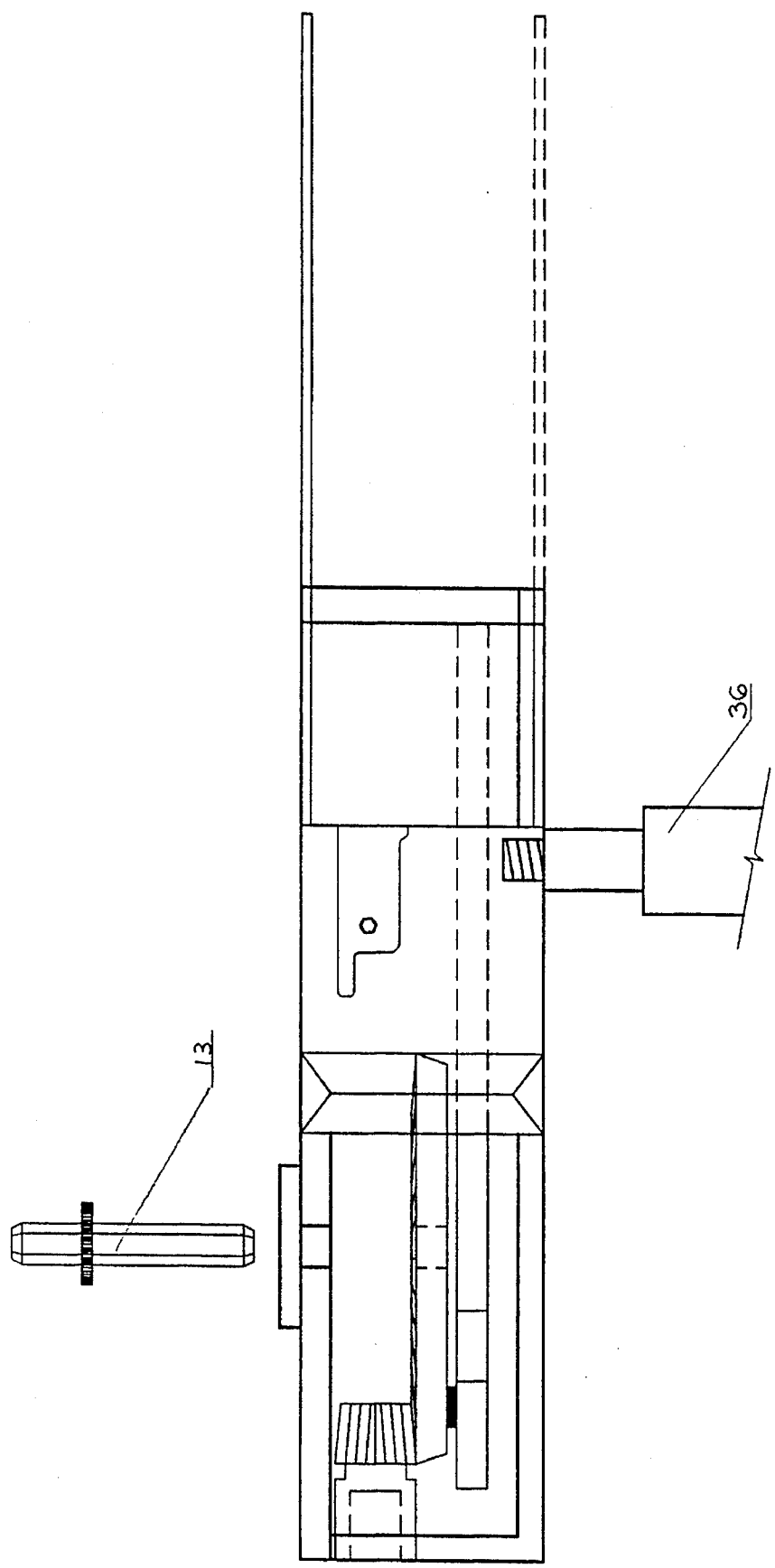

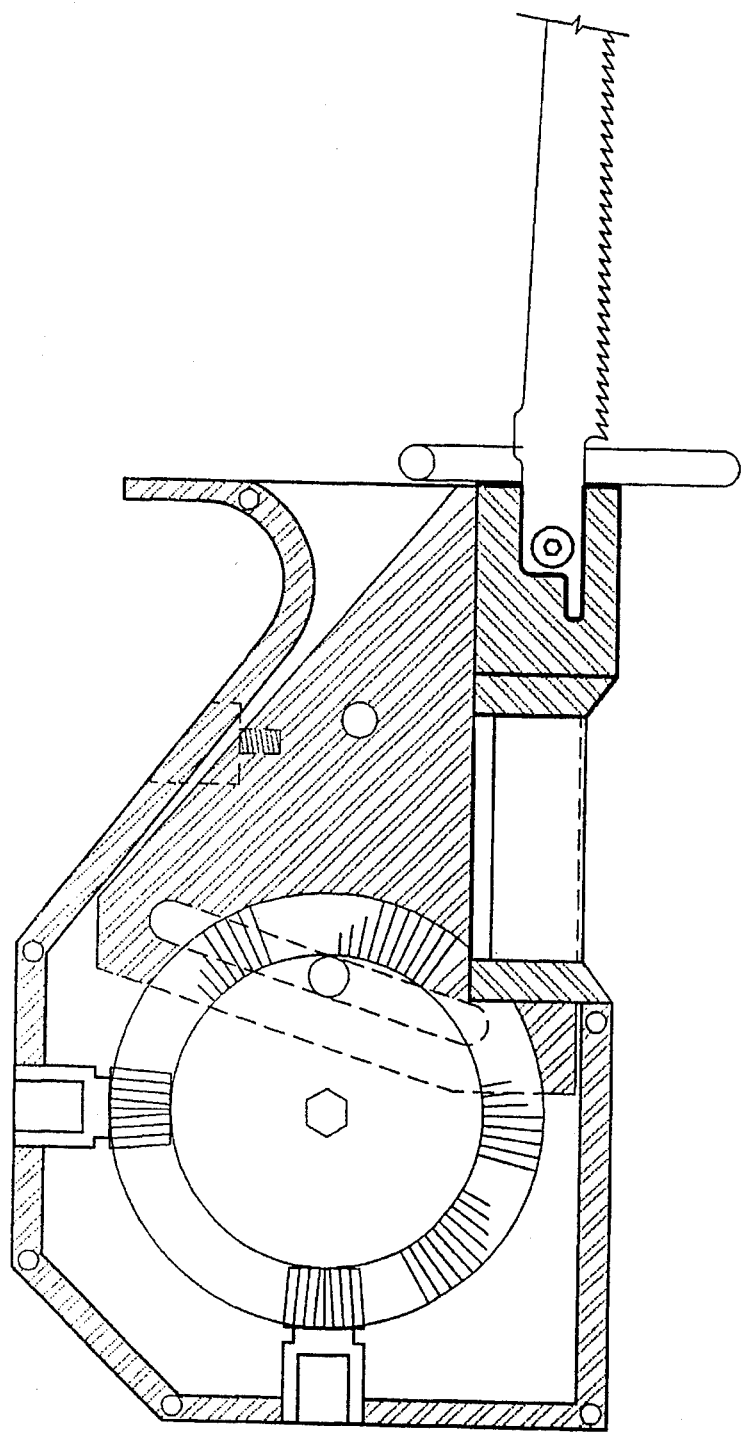
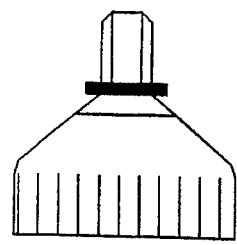
FIGURE #6

DRILL ACCESSORY

CROSS REFERENCE TO RELATED APPLICATION

This application is a continuation-in-part of U.S. patent application Ser. No. 08/414,029 filed Mar. 31, 1995 and entitled "DRILL ATTACHMENT", pending.

BACKGROUND

1. Field of Invention

This invention relates to hand power tools specifically used for sawing materials in awkward and/or remote places.

2. Discussion of Prior Art

Original reciprocal saws were quite straightforrward; a few evolved into a battery operated feature. However, they still had their significant drawbacks. I discovered and observed that size and weight were not necessary to accomplish certain tasks.

The growing popularity of the cordless drill has made it a convenient power source for this tool.

The reciprocal saws on the market today are neither compact or have sufficient features to justify their price. So often the user has to reach a difficult location to make a flush cut, and cannot.

The present invention can be attached to a drill as easily as a drill bit. The keyless feature of today's chuck expedites the process. Because of the lack of a motor, this invention is a more affordable to the consumer who realizes that only this attachment need be purchased.

1. Sawing device attachable to regular electric drill: U.S. Pat. No. 4949463

Yi Chang Chen—Aug. 21, 1990
This tool attachment mounts to the drill just one (1) way. It appears to be a fixed part of the drill. Possibly tools are needed to mount and dismount saw function.

2. Drill powered saber saw: U.S. Pat. No. 4841643

Vincent J. Colella—Jun. 27, 1989
This tool attachment is merely a long flexible cable that is powered by a drill motor to a tethered reciprocating head which appears not to be strong enough to handle everyday use.

3. Cordless reciprocating saw: Design U.S. Pat. No. 308469—Model No. 4390D/DW
This Makita cordless reciprocating saw is part of the 9.6 volt cordless system, and employs the motor, battery and mechanism all in one unit. The stroke is a mere nine-sixteenths inch (9/16"). Also, the Makita blade mounts only in one position and does not have any flush cut features.

4. Cordless multi-purpose saw: Patent Pending—Model No. VP650T
This Black and Decker cordless multi-purpose saw is part of their 7.2 Volt Versa Pack System. This is a scaled-down version of the Makita cordless reciprocating saw mentioned above, This tool was designed for light-duty tasks and uses only smaller jigsaw-type blades. The batteries in the Black and Decker tool have two-thirds less power and longevity in comparison. The blade stroke is one inch (1") on the Black and Decker's.

These are the closest "prior art" that I am aware of as of Dec. 21, 1995.

Mostly all the reciprocating saws on the market today have several disadvantages:

1. Most are not cordless.
2. The stroke distances are only one and one-fourth inches (1¼")
3. None have flush-cut features.
4. They all mount their blade in a similar position/manner.
5. With all others, the blade travels only in one (1) direction from the motor body.
6. They are quite cumbersome, much heavier, and more costly.
7. They will not fit into tight areas or do ninety degree (90°) cutting tasks.

SUMMARY OF THE INVENTION

Traditionally reciprocating saws came onto the market to be convenient and easier to complete a cutting task. During construction and especially remodeling there is always something to cut or remove. In the past the user would get out the reciprocating saw, untangle an extension cord and then locate a working receptacle, then tackle the task at hand. Now with cordless drill having ample power, torque and battery longevity, any cutting task can be accomplished much faster and with satisfactory results.

The sawing device attachable to regular drill U.S. Pat. No. 4949463 Yi Chang Chen Aug. 21, 1990 is not easily removable and does not operate in multiple different positions.

Mostly, all reciprocating saws have only one to one and one-fourth inch (1"–1¼") stroke or cut motion.

The cordless drills today, when used as the power source, have the added feature of a multiple clutch setting that protects the user and the tool.

The cost, too, is an important and it is of not, that every electrical reciprocating saw on the market sells for several times the price of my "Drill Accessory".

This tool is very useful around the house. Simply put, almost every home has an electric or cordless drill. This tool is designed to not only cut wood but just about any substance as long as the proper blade has been installed.

OBJECTS AND ADVANTAGES

After researching I found only one patent that even came remotely close to mine which is U.S. Pat. No. 4949463 to Yi Chang Chen, Aug. 21, 1990.

Objects and Advantages will be done on the basis of existing reciprocating saws rather than drill attachments.

To date I have seen a few cordless reciprocating saws. My drill accessory was conceived for versatility,practicality and flush cutting. It weighs less than half of the existing reciprocating saws including the weight of the drill itself. It incorporates three (3) flush cut features in which the blade design protrudes from the unit on either side or on the bottom. The working motion or stroke is one and three-fourths inches (1¾") while others are content with one inch (1")(as the Black and Decker) or one and one-fourths (1¼") (Sawzall). My invention can be connected to the drill motor in three (3) different positions, which none of the others can do. A choice of blade speed is selected on the outer or inner hub bevel gear. Any quality drill on the market has variable speed and clutch setting adjustments which will enhance the safety of the drill accessory tool. So often, I have encountered tight and awkward places that a normal reciprocating saw would just not fit. The ninety (90°) degree feature is the solution to this problem. The fact that it is cordless means no need for an extension cord or a working electrical outlet. Further objects and advantages of my invention will become apparent from viewing the drawings and ensuing description.

In some instances the user has to drill a starter hole before progressing to the sawing. The reason being that the back and forth motion of the saw blade actually bounces erratically, jumping off target and usually bending or breaking the blade; not to mention the pounding and jarring the user encounters until they have fully penetrated the material in question. Reciprocating saws on the market vary in features, quality and cost. The majority of them have two (2) speeds, high and low, and for an added cost they have variable speed. Here again I would like to emphasize no clutch setting.

My "Drill Accessory" tool is totally powered by the drill motor which can be controlled if need be by the desired clutch setting. With the variable speed drill the user could start out at a snail's pace if needed for filing or sanding.

BRIEF DESCRIPTION OF THE DRAWINGS

FIG. 1 is a front cross section view representing the mechanism of the drill accessory in accordance with an exemplary embodiment of the present invention taken along line 1—1 in FIG. 3;

FIG. 2 is a back plan view illustration of the drill accessory of FIG. 3;

FIG. 3 is a side cross section representation of the drill accessory;

FIG. 4 is a top cross-section illustration taken along line 4—4 in FIG. 6;

FIG. 5 is a bottom plan view representation with a portion of the base removed to show internal parts; and FIG. 6 is a side cross-section illustration with the blade of the drill accessory in its extended position.

DETAILED DESCRIPTION OF THE PREFERRED EMBODIMENT

Figure 7:
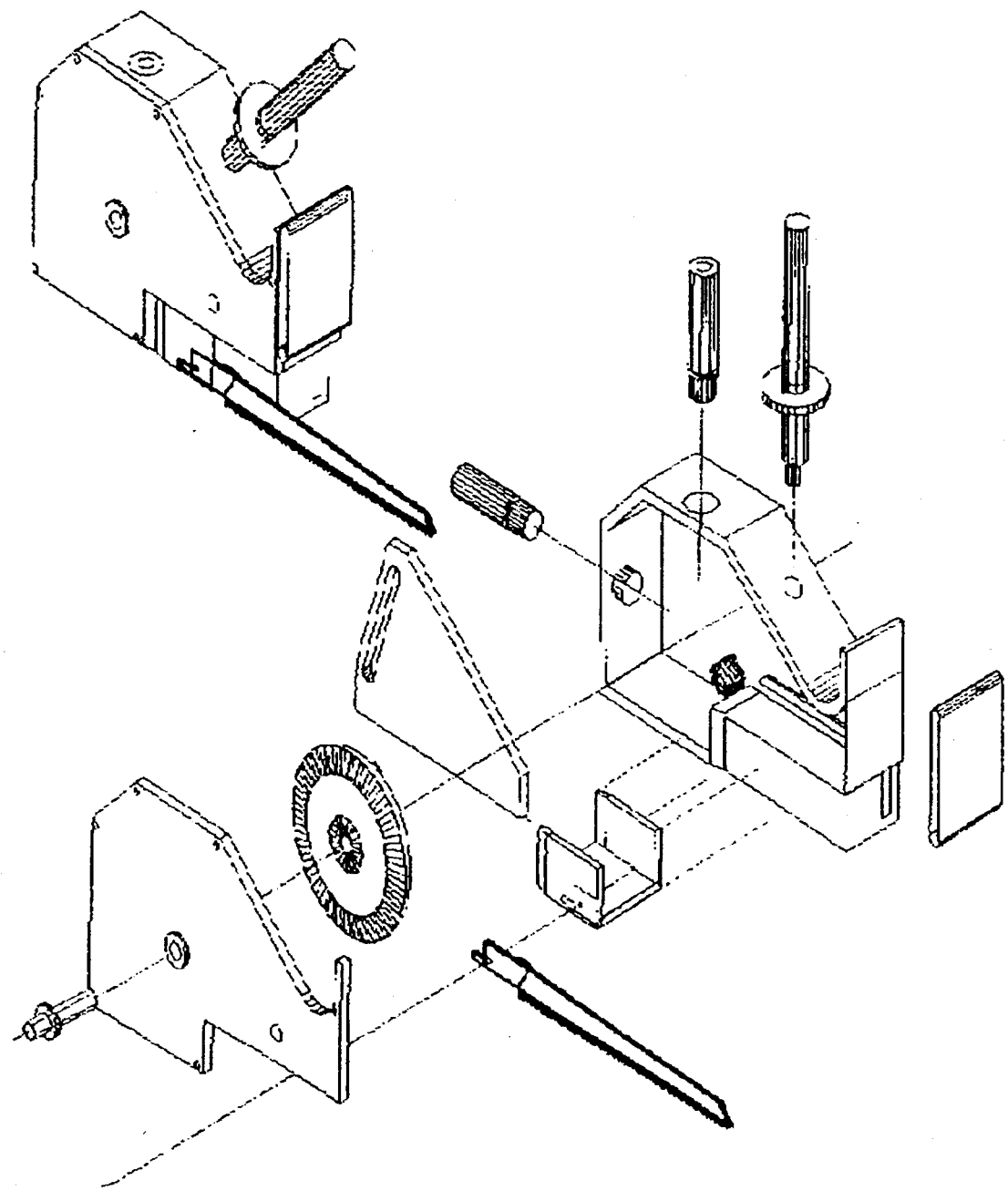
FIG. 7 shows tool fully assembled and also an exploded view.

Referring to FIG. 3, a sawing device attachable to an electric, pneumatic or cordless drill converting rotary motion to reciprocal motion.

From the power source Drill Chuck #11 fits into a Hexagon Shaft #13 which fits one of three Female Sockets #15 or #15b which is connected to one of two small bevel gears (#21A) that meshes with a larger Bevel Outer Gear #25 or on to the larger bevel inner gear #42. An eccentric peg #23 is mounted on said larger Bevel Gear #25, an elongated slot in the Drive Arm #47 fits onto the said eccentric peg. A Drive Arm #45 slides back and forth guided and supported by grooved Metal Housing #17. A Saw Blade #33 is attached in one of three ways to said drive arm by means of a Set Screw #35. A Hand Safety Stop #27 prevents user from accidental injury on saw blade. Removable Handle #36 can be screwed into Threaded Hole #34 on either side of tool or threaded into hole on top side of tool #26 for stabilizing purposes. Another angle that Hex Shaft #13 is used is by inserting into Female Hex Hole #43 to use tool 90° from drill motor. Angled elongated Slot #47 gives tool a very unique feature and that is,the speed of the inward or cutting stroke is faster than the outward or cleaning stroke. A third small Bevel Gear #41 stabilizes said larger Bevel Gear #25 during use. Exterior portion of Drive Arm #37 has saw blade mounted in one of three positions. Void Space #39 is designed into Right,Left and Bottom of tool not to pinch user during use. The Fence #29 has a two position feature, up for flush cutting, down for use. Pivot Point #31 allows for this unique feature.

What is claimed is:

1. A power tool attachment for converting rotary motion from a power tool into reciprocating motion of a saw comprising: a housing, a first gear mounted in said housing and having a peg mounted eccentrically thereon, a blade connected to a blade drive arm, said blade drive arm reciprocable in said housing and having a slot therein, said peg received in said slot, a pair of second bevel gears mounted in said housing orthogonally with respect to each other and each being engaged with said first bevel gear, said second bevel gears each having a recess therein, said first bevel gear having a recess in a center portion thereof, and a drive pin receivable in any one of said recesses and a rotatable power tool chuck at opposite ends thereof, whereby rotation of said power tool chuck enables the reciprocation of said blade along an axis parallel to a rotation axis of said power tool chuck or along any axis orthogonal to said axis of said power tool chuck depending upon which recess the drive pin is received.

2. The power tool attachment of claim 1, wherein said recesses in said first and second bevel gears are hexagonal recesses.

3. The power tool attachment of claim 1, wherein said second bevel gears are smaller in diameter than said first bevel gear, such that said saw blade reciprocates at a greater frequency when said drive pin is engaged with the recess of said first bevel gear, than when said drive pin is engaged with either of said second bevel gears.

4. The power tool attachment of claim 1, further comprising a saw fence pivotally mounted to said housing between a position adjacent said saw blade and a position spaced from said saw blade.

* * * * *